3,036,006
METHOD OF DOPING A SILICON MONO-CRYSTAL
Franz Nissl, Koln-Stammheim, Germany, assignor to Siemens & Halske Aktiengesellschaft, Berlin and Munich, Germany, a German corporation
No Drawing. Filed Jan. 26, 1959, Ser. No. 788,789
Claims priority, application Germany Jan. 28, 1958
10 Claims. (Cl. 252—62.3)

My invention relates to a method of doping silicon monocrystals with donor or acceptor atoms for use of the doped crystal in electric semiconductor devices, such as transistors or photoelectric cells.

Relative to the doping of semiconductor bodies, preferably of silicon, with boron, it has been proposed to place the semiconductor body as well as elemental boron into a reaction vessel filled with air or oxygen, and to heat the vessel and the substances contained therein for several hours to a temperature below the melting point of the particular semiconductor body, and under greatly reduced pressure of a few millimeters Hg, for example down to $10^{-6}$ mm. Hg, the temperature of the reaction vessel being kept sufficiently high to permit a reaction of the elemental boron with the surrounding rarefied gas atmosphere.

With methods of this type, the surface of the silicon crystal, in most cases, becomes coated with layers of excessive boron or boron nitride. Such coatings can be electrically contacted only with difficulty and in most cases have a spotty appearance.

It is an object of my invention to device a method that reliably produces uniform and readily contactable surfaces of good appearance, good appearance being desirable if the boron-doped crystals must be suitable for use as photoelectric devices to be built into the dials of timers or other time pieces.

My invention is predicated upon the observation that when crystals are being doped with elemental boron it sometimes happens that parts of the coating tend to scale off the crystal surface and separate themselves from the crystal after completing the tempering and cooling of the crystal. The areas thus laid bare beneath the scaled-off layers have been found to be well contactable electrically. They also show a pleasant, uniform and silky luster similar to that of dull, chrome-plated metal parts.

It is another object of my invention to produce such self-peeling layers intentionally in order to reliably arrive at well contactable boron-doped silicon monocrystals of good contactability and good appearance.

According to the preferred method of my invention, the silicon crystals are first tempered together with a mixture of elemental boron and pulverulent silicon dioxide (quartz). Thereafter the layers of self-peeling substance that form themselves upon the surfaces of the silicon crystals during the preceding method step, are removed by a second method step. Apparently, during the first method step there occurs a reaction between the silicon dioxide and the boron, resulting in the formation of boron trioxide and silicon monoxide. It is the vapor of these two compounds which, probably, produces the desired self-peeling layers.

An example of the method will be described presently:

Silicon crystal discs together with a mixture of elemental amorphous boron and pulverulent silicon dioxide (quartz) are tempered together in a tube of quartz or other temperature resistant material. The tempering is effected at approximately 1200° C. in vacuum produced by a diffusion pump. The segregation of the boron and the diffusion of the boron into the silicon crystal can be varied within wide limits by varying the quantitative ratio of silicon dioxide and boron, the duration of the tempering operation, and the tempering temperature. An increase in proportion of silicon dioxide results in thicker and more easily peeling layers. An increase in tempering period and an increase in temperature result in thicker p-type layers within the crystal.

The following processing data have been found particularly suitable:
 (1) Tempering in a vacuum of $10^{-5}$ mm. Hg.
 (2) Duration of tempering, 8 to 18 hours.
 (3) Tempering temperature between 1050 and 1300° C.
 (4) Weight ratio of boron to $SiO_2$ between 50:1 and 5:1.
 (5) Mounting the silicon discs, along a length of 25 cm., above the boron-silicon dioxide mixture in a horizontal quartz tube of 25 mm. in diameter. The tube is connected to a vacuum pump of 3 liters per second suction power.

I claim:

1. A method of doping of a silicon semiconductor with boron, comprising heating the silicon and elemental boron for several hours in a rarefied atmosphere comprising a free oxygen-containing gas at a temperature below the melting point of the silicon, and thereafter removing the layers which form, during the preceding heating, upon the surfaces of the silicon crystals, and which tend to scale off, said gas comprising a member of the group consisting of oxygen and oxygen-nitrogen mixtures, silicon dioxide being introduced during said heating, the boron and silicon dioxide being in admixture, the silicon semiconductor being in the form of plates and being mounted above the mixture, in the heating zone, the heating comprising a tempering at 1050 to 1300° C. under a gas pressure of less than $10^{-5}$ mm. mercury, gas being evacuated during the tempering.

2. A method of doping silicon semiconductor crystals with boron, comprising heating said semiconductor crystals in the presence of gas evolved by heating boron and silicon dioxide for several hours under vacuum in a rarefied oxygen gas atmosphere at a temperature below the melting point of the silicon, and thereafter cooling and removing the layers which form, during the preceding heating, upon the surfaces of said silicon crystals.

3. A method of doping silicon semiconductor crystals with boron, comprising heating said semiconductor crystals in the presence of gas evolved by heating boron and silicon dioxide for several hours under vacuum in a rarefied oxygen gas atmosphere at a temperature below the melting point of the silicon, and thereafter cooling and removing the layers which form, during the preceding heating, upon the surfaces of said silicon crystals, said heating being at about 1050 to 1300° C.

4. A method of doping silicon semiconductor crystals with boron, comprising heating said semiconductor crystals in the presence of gas evolved by heating boron and silicon dioxide for several hours under vacuum at a temperature below the melting point of the silicon, and thereafter cooling and removing the layers which form, during the preceding heating, upon the surfaces of said silicon semi-conductor crystal, said heating being at about 1050 to 1300° C., in a rarefied gas atmosphere comprising a gas of the group consisting of oxygen and oxygen-nitrogen mixtures, the heating being under concomitant gas evacuation.

5. A method of doping silicon crystals with boron, comprising treating the silicon crystal in a reaction zone of a processing space for a plurality of hours at subatmospheric pressure and at a temperature below the melting point of silicon, the atmosphere in said zone containing boron produced by simultaneously heating a mixture of elemental amorphous boron and pulverulent silicon dioxide, said mixture being located in the processing space, so that gas given off by the mixture reaches the surface of the silicon crystals, and so that the boron atoms diffuse into the silicon crystal, the simultaneous heating of the silicon crystal and the boron-silicon dioxide mixture being carried out by heating the processing space, the quantitative ratio of the silicon dioxide and the elemental boron being such that self-scaling layers are formed on the surface of the silicon crystal, which layers are removed after termination of the heat treatment.

6. A method of doping silicon crystals with boron, comprising treating the silicon crystal in a reaction zone of a processing space for a plurality of hours at subatmospheric pressure and at a temperature below the melting point of silicon, the atmosphere in said zone containing boron produced by simultaneously heating a mixture of elemental amorphous boron and pulverulent silicon dioxide, said mixture being located in the processing space, so that gas given off by the mixture reaches the surface of the silicon crystals, and so that the boron atoms diffuse into the silicon crystal, the simultaneous heating of the silicon crystal and the boron-silicon dioxide mixture being carried out by heating the processing space, the quantitative ratio of the silicon dioxide and the elemental boron being such that self-scaling layers are formed on the surface of the silicon crystal, which layers are removed after termination of the heat treatment, the atmosphere containing a gas taken from the group consisting of oxygen and air, said mixture being heated out of contact with said silicon crystal.

7. A method of doping silicon crystals with boron, comprising treating the silicon crystal in a reaction zone of a processing space for a plurality of hours at subatmospheric pressure and at a temperature below the melting point of silicon, the atmosphere in said zone containing boron produced by simultaneously heating a mixture of elemental amorphous boron and pulverulent silicon dioxide, said mixture being located in the processing space, so that gas given off by the mixture reaches the surface of the silicon crystals, and so that the boron atoms diffuse into the silicon crystal, the simultaneous heating of the silicon crystal and the boron-silicon dioxide mixture being carried out by heating the processing space, the quantitative ratio of the silicon dioxide and the elemental boron being such that self-scaling layers are formed on the surface of the silicon crystal, which layers are removed after termination of the heat treatment, the weight ratio of boron to $SiO_2$ being between 50:1 and 5:1, said mixture being heated out of contact with said silicon crystal.

8. The method defined in claim 5, wherein the heating is effected in vacuum under a pressure of less than $10^{-5}$ mm. Hg.

9. The method defined in claim 5, wherein the heating is from 8 to 18 hours.

10. The method defined in claim 5, wherein the temperature is from 1050° to 1300° C.

References Cited in the file of this patent

UNITED STATES PATENTS

| | | |
|---|---|---|
| 2,419,237 | Treuting | Apr. 22, 1947 |
| 2,437,269 | Ohl | Mar. 9, 1948 |
| 2,785,095 | Pankove | Mar. 12, 1957 |
| 2,810,870 | Hunter et al. | Oct. 22, 1957 |
| 2,873,221 | Nijland et al. | Feb. 10, 1959 |
| 2,879,190 | Logan et al | Mar. 24, 1959 |
| 2,906,647 | Roschen | Sept. 29, 1959 |